United States Patent [19]
Komatsu et al.

[11] Patent Number: 5,872,899
[45] Date of Patent: Feb. 16, 1999

[54] IMAGE INFORMATION PROCESSING SYSTEM

[75] Inventors: Yasuo Komatsu; Kouji Yorimoto; Eiji Shimoichi; Hajime Sakashita, all of Saitama, Japan

[73] Assignee: Fuji Xerox Co., Ltd., Tokyo, Japan

[21] Appl. No.: 764,584

[22] Filed: Dec. 13, 1996

[30] Foreign Application Priority Data

Dec. 14, 1995 [JP] Japan .................................. 7-347351

[51] Int. Cl.$^6$ .......................... G06K 15/02; H04M 1/405
[52] U.S. Cl. ............................................ 395/109; 358/298
[58] Field of Search ............................. 395/109; 382/237, 382/270; 358/456, 457, 458, 460, 298

[56] References Cited

U.S. PATENT DOCUMENTS 5,125,045  6/1992  Murakami et al. ...................... 382/270
5,625,716  4/1997  Borg ....................................... 358/456

FOREIGN PATENT DOCUMENTS 4-120876  4/1992  Japan .
5-167836  7/1993  Japan .

*Primary Examiner*—Scott Rogers
*Attorney, Agent, or Firm*—Finnegan, Henderson, Farabow, Garrett & Dunner, L.L.P.

[57] ABSTRACT

A ROM stores density conversion tables appropriate for a present apparatus to execute recording and standard density conversion tables. As a command is entered on a control panel, a CPU sets the optimum density conversion table in a RAM and again converts image data of 256 levels of gradation for a density adjustment. Resultant image data undergoes false halftone processing in an error diffusion circuit and is transmitted to the present apparatus or a destination recorder. When the record characteristic of the destination recorder is unknown, the standard density conversion table is used, so that no large difference occurs for recording.

16 Claims, 17 Drawing Sheets

FIG. 16

| 67 | 71 | 62 | 68 | 65 | 67 | 59 | 61 | ... |
|----|----|----|----|----|----|----|----|-----|
| 61 | 66 | 61 | 65 | 59 | 66 | 62 | 61 | ... |
| 65 | 62 | 58 | 64 | 60 | 60 | 57 | 62 | ... |
| 64 | 65 | 61 | 65 | 60 | 65 | 60 | 56 | ... |
| 68 | 69 | 65 | 66 | 59 | 64 | 61 | 60 | ... |
| 65 | 67 | 62 | 64 | 65 | 61 | 51 | 60 | ... |
| 66 | 68 | 66 | 69 | 58 | 58 | 58 | 56 | ... |
| 67 | 70 | 65 | 68 | 60 | 60 | 52 | 60 | ... |
| :  | :  | :  | :  | :  | :  | :  | :  |     |

| 0 | 128 | 32 | 160 | 8 | 136 | 40 | 168 |
| --- | --- | --- | --- | --- | --- | --- | --- |
| 192 | 64 | 224 | 96 | 200 | 72 | 232 | 104 |
| 48 | 176 | 16 | 144 | 56 | 184 | 24 | 152 |
| 240 | 112 | 208 | 80 | 248 | 120 | 216 | 88 |
| 12 | 140 | 44 | 172 | 4 | 132 | 36 | 164 |
| 204 | 76 | 236 | 108 | 196 | 68 | 228 | 100 |
| 60 | 188 | 28 | 156 | 52 | 180 | 20 | 148 |
| 252 | 124 | 220 | 92 | 244 | 116 | 212 | 84 |

110

IMAGE INFORMATION PROCESSING SYSTEM

BACKGROUND OF THE INVENTION

This invention relates to an image information processing system in which recording or displaying changes depending on the display or record characteristics of the display destination as in a workstation, etc., connected to a network to which facsimile machines and printers are connected, and in particular to an image information processing system which enables good images to be displayed or recorded independently of such display or record characteristics.

If an image information processing system for recording monochrome binary image data, typified by a facsimile machine, binarizes read image information simply, it cannot reproduce a delicate tone of a halftone image such as a photograph although it can reproduce good line drawings. Then, hitherto, false halftone processing of artificially reproducing halftone, such as a dithering method or an error diffusion method, has been adopted if such an image information processing system needs to reproduce halftone. In the false halftone processing, light and shade are produced according to the occupation percentage of black pixels in a unit area; this is referred to as area gradation representation.

FIG. 16 represents the density of each unit pixel of an original document at 256 levels. An arrow 101 indicates a horizontal scanning direction as a placement direction of an image sensor (not shown) for an original document 102 and an arrow 103 orthogonal to the direction indicates a vertical scanning direction. The unit pixels correspond to record elements in the minimum units for display (the term "display" simply mentioned in the specification contains recording by a recorder as well as displaying on a display, but only recording by the recorder will be hereinafter referred to as record(ing) in principle.)

FIG. 17 represents one example of threshold values of a dither matrix. In the example, the dither matrix 110 has an 8×8 matrix structure in which 64 threshold values are set in total.

FIG. 18 represents a part of image data resulting from binarizing the image information of the maniscript shown in FIG. 16 using the dither matrix shown in FIG. 17. The image data 120 corresponds to data provided by putting the dither matrix 110 shown in FIG. 17 on the 8×8 unit pixel area in the upper left corner of the original document 102 in FIG. 16 and binarizing the densities of the unit pixels with the corresponding threshold values in the dither matrix 110. For example, for the unit pixel in the upper left corner, the image information density 67 and the threshold value in the dither matrix 110 corresponding thereto is 0, thus the unit pixel is converted into a black unit pixel 121. For the unit pixel 122 horizontally adjacent to the unit pixel 121, the image information density is 71 and the threshold value in the dither matrix 110 corresponding thereto is 128, thus the unit pixel is converted into white. Other pixel units are processed in a similar manner.

FIG. 19 shows an example of an error diffusion process pattern. In the error diffusion process pattern 130 in the figure, the unit pixel indicated by X is the current unit pixel 131 to be processed. The threshold density level is 128, a half of 256 gradations.

FIG. 20 represents a part of image data resulting from binarizing the image information of the original document shown in FIG. 16 using the error diffusion process pattern shown in FIG. 19. In the error diffusion technique, the current unit pixel 131 scans starting at the upper left corner of the original document 102 (FIG. 16) in order and binarization is performed to generate image data 140. First, for the unit pixel 141 in the upper left corner of the original document 102 shown in FIG. 16, binarization of density 67 with threshold value 128 is executed, resulting in a white pixel.

Since the density of the white pixel is 0 at the recording time, an error corresponding to density 67 occurs. Then, the error is distributed to the pixel units in the process pattern 130. At a ⅛ distribution place, 8.4 density occurs and at a ⅜ distribution place adjacent to the ⅛ distribution place, a 25.1 density error occurs. Likewise, the process pattern 130 moves on the original document 102 in such a manner that the respective unit pixels are scanned for each line in order, and binarization processing of the pixel units is performed. In the error diffusion technique, binarization is executed while occurring errors are added, thus finally no density error occurs.

By the way, FIGS. 18 and 20 assume that the black or white pixels in image data 120, 140 are rectangles of the same size and are placed with no gaps. However, the size of each unit pixel at the recording time varies from one recorder to another because of the recording system difference, etc., under the present circumstances.

FIGS. 21 and 22 illustrate how image data provided by false halftone processing as shown in FIG. 18 or 20 is recorded by a recorder in different densities. In the example shown in FIG. 21, the size of a record dot 151 indicated by a black dot (●) is smaller than that of a unit pixel, in which case the black occupation area when area gradation representation is applied decreases relatively, thus the image is represented as a low-density image as a whole. In the example shown in FIG. 21, the black dot occupation percentage is about 17% and corresponds to the gradation of the eleventh level in 64 levels.

In contrast, in the example shown in FIG. 22, the size of a record dot 161 is larger than that of a unit pixel, in which case the black occupation area when area gradation representation is applied increases relatively, thus the image is represented as a high-density image as a whole. In the example shown in FIG. 22, the black occupation percentage becomes about 38% and corresponds to the gradation of the 24th level in 64 levels. Generally, laser printers tend to provide larger black dot diameters as shown in FIG. 22.

Even if the image data is subjected to the same false halftone process, if it is recorded by different recorders, it is represented at different densities; the image of the image data recorded by one recorder is represented almost in white and the image of the same image data recorded by another recorder is represented almost in black.

When the copy function of a facsimile machine is positively used or reading and recording of an image is performed by a single machine like a copier, of course, adjustments of threshold values in a dither pattern, for example, as shown in FIG. 17 can be carried out individually in response to the record characteristics of the recorder of the machine. Therefore, if such an image information processing apparatus comprises a recorder wherein there is a fear that the density may become low as a whole as shown in FIG. 21, for example, the threshold values are preset low, whereby the threshold level at binarization can be lowered and the whole density level can be enhanced. In contrast, if the image information processing system comprises a recorder wherein there is a fear that the density may become high as a whole as shown in FIG. 22, for example, the threshold values are preset high, whereby the threshold level at binarization can be raised and the whole density level can also be lowered.

However, for example, a present apparatus may read image information and send it to a recorder of another apparatus for recording the image information. Typically, image information read by one facsimile machine is sent to another facsimile machine for reproducing an image. In such a case, if compatibility between the two machines is poor, the image information reproduced by the receiving image information processing apparatus may become considerably dark or pale.

For example, the present apparatus may record with comparatively small record dots as shown in FIG. 21. In such a case, the present apparatus lowers the threshold level and intentionally increases the black area occupation percentage so that the density of the original document 102 as shown in FIG. 16 is reproduced intact. However, when the apparatus thus changing the threshold level and binarizing data sends the resultant image data to another image information processing apparatus, if the recorder of the receiving image information processing apparatus has a record characteristic as shown in FIG. 22, the image data processed darkly is recorded furthermore darkly.

In contrast, it is assumed that there is an image information processing apparatus comprising a recorder having a record characteristic as shown in FIG. 22. This image information processing apparatus reads an original document 102, processes an image slightly palely, and records the resultant image by a recorder of the apparatus, thereby adjusting the image density. However, assuming that image data prepared by such an image information processing apparatus is binarized and then the resultant data is sent to a recorder having a record characteristic as shown in FIG. 21, the image data processed somewhat palely in dithering is used to perform image reproduction processing palely more and more, thus the image is represented excessively palely.

In any case, the number of gradations of an image that can be reproduced is decreased and the image quality is degraded. For example, if optimization is executed in the recorder having the record characteristic as shown in FIG. 21, about 24 black record dots are required to output the 16th gradation. When image data in the state is transmitted to the recorder having the record characteristic shown in FIG. 22, the 36th gradation is recorded and a low density cannot be reproduced.

SUMMARY OF THE INVENTION

It is therefore an object of the invention to provide an image information processing apparatus to prevent a recording density in the case where the present apparatus executes recording based on read image information from greatly differing from a recording density in the case where another apparatus executes recording based on the read image information.

According to a first aspect of the invention, an image processing apparatus comprises image information input means for inputting image information; density adjustment means for adjusting a density of the image information input through said image information input means at several levels; false halftone process means for performing false halftone processing for the image information input through said image information input means; density conversion characteristic storage means for storing a plurality of density conversion characteristics required when the false halftone processing is performed, for each type of a plurality of display destinations and for each of the levels of said density adjustment means; density conversion characteristic selection means for selecting one among the plurality of density conversion characteristics stored in said density conversion characteristic storage means in response to the type of said display destinations for the image information and the adjustment level at which said density adjustment means has adjusted the density of the image information; and image data sending means for sending image data, for which the false halftone processing has been performed according to the density conversion characteristic selected by said density conversion characteristic selection means, to said display destinations in which the image data is to be displayed.

According to a second aspect of the invention, an image processing apparatus comprises image information input means for inputting image information; density adjustment means for adjusting a density of the image information input through said image information input means at several levels; false halftone process means for performing false halftone processing for the image information input through said image information input means; density conversion characteristic storage means for storing a plurality of density conversion characteristics required when the false halftone processing is performed, for each type of a plurality of display destinations and for each of the levels of said density adjustment means; display characteristic determination means for determining display characteristics of said display destinations for the image information; density conversion characteristic selection means for selecting one among the plurality of density conversion characteristics stored in said density conversion characteristic storage means in response to a result of determination by said display characteristic determination means; and image data sending means for sending image data, for which the false halftone processing has been performed according to the density conversion characteristic selected by said density conversion characteristic selection means, to said display destinations in which the image data is to be displayed.

According to a third aspect of the invention, in the image processing apparatus of the first or second aspect of the invention, said display destinations is record means of an apparatus to which the image data is to be transmitted. For example, it corresponds to the record section of the receiving party in a facsimile machine or a printer connected to the receiving personal computer.

According to a fourth aspect of the invention, in the image processing apparatus of the second aspect of the invention, when said image data sending means sends the image data to display destinations not having the same display characteristic as said image processing apparatus, said density conversion characteristic selection means selects a density conversion characteristic for performing false halftone processing of a standard display characteristic. This produces a practical effect in that image data can be transmitted without checking the associated party for record characteristic.

According to a fifth aspect of the invention, in the image processing apparatus of the second aspect of the invention, said density conversion characteristic selection means selects a density conversion characteristic for performing false halftone processing of a standard display characteristic for said display destinations whose display characteristic cannot be determined by said display characteristic determination means. When the record characteristic determination means determines the record characteristic, if a density conversion characteristic is selected accordingly, the best result can be obtained, of course. If the record characteristic determination means cannot determine the record characteristic, the image data is corrected to image data of the standard characteristic and the resultant image data is transmitted, thereby preventing the image display (record) density from differing greatly.

According to a sixth aspect of the invention, in the image processing apparatus of the second aspect of the invention, said display characteristic determination means comprises means for determining a model of an apparatus with which said image processing apparatus is to communicate, a table for listing correspondence between models and their record characteristics, and record characteristic sense means for looking up in said table and sensing a record characteristic from the model determined by said model determination means. As one technique for determining the record characteristic, the model of the associated apparatus is known and the most appropriate recorder can be selected.

According to a seventh aspect of the invention, in the image processing apparatus of the first or second aspect of the invention, the false halftone processing is halftone processing by error diffusion.

According to an eighth aspect of the invention, in the image processing apparatus of the first or second aspect of the invention, the false halftone processing is halftone processing with a dither matrix.

According to a ninth aspect of the invention, in the image processing apparatus of the first or second aspect of the invention, at least one of said display destinations is record means of said image processing apparatus. For example, it is effective not only for the case where the record characteristic applied when the present apparatus makes a copy needs to be made different from that when another apparatus executes recording, but also for the case where the present apparatus is connected to a plurality of printers via a network such as Ethernet.

According to a tenth aspect of the invention, in the image processing apparatus of the first or second aspect of the invention, said density conversion characteristic storage means stores at least two density conversion characteristics, one being a density conversion characteristic for reproducing the image information in said image processing apparatus and the other being a density conversion characteristic for reproducing the image information in a standard apparatus.

According to an eleventh aspect of the invention, in the image processing apparatus of the first or second aspect of the invention, said image information input means is means for reading the image information of an original document. Many image information processing apparatuses such as facsimile machines and copiers are applied. Of course, image data may be input by other techniques online or offline or may be generated in the present apparatus.

BRIEF DESCRIPTION OF THE DRAWINGS

FIG. 16 is an illustration to represent the density of each unit pixel of one original document at 256 levels;

DETAILED DESCRIPTION OF THE INVENTION

Figure 1:
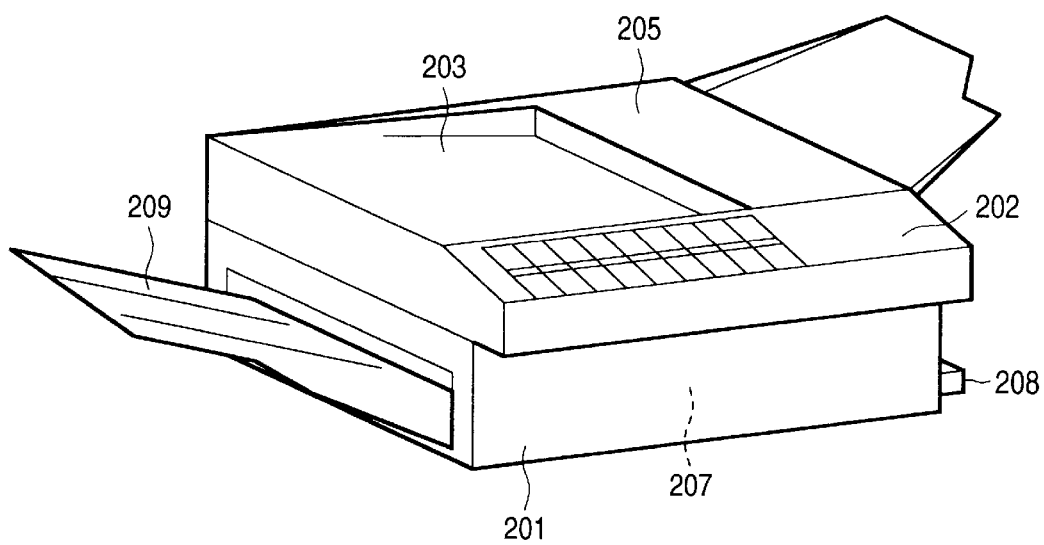
FIG. 1 is a perspective view to represent the appearance of a facsimile machine as an image information processing apparatus in a first embodiment of the invention.

Referring now to the accompanying drawings, preferred embodiments of the invention will be described.
First embodiment FIG. 1 represents the appearance of a facsimile machine as an image information processing apparatus in a first embodiment of the invention. In the embodiment, use of a pair of transmitting and receiving facsimile machines will be discussed. The facsimile machine shown in FIG. 1 or another facsimile machine having substantially the same function can also be used, needless to say, in a case where, for example, a personal computer outputs an image read through an image scanner to a printer in the present apparatus, transmits image data to a destination facsimile machine via communication means such as ISDN (integrated services digital network), or receives image data from a source facsimile machine via communication means.

The facsimile machine in FIG. 1 comprises a control panel 202 for operating the facsimile machine placed on the top front of a main unit 201 and an original document placement support 203 for placing an original document as a slope at the back side of the control panel 202. A plurality of original documents (not shown) are placed on the original document placement support 203. When the control panel 202 is operated, sheets from the lowest original document to the top are fed into the main unit 201 one at a time in order, and read through a reader 205 containing a one-dimensional image sensor one line at a time in order.

On the other hand, a recorder 207 using the principle of xerography is placed in the main unit 201 and a detachable paper tray 208 is housed below the recorder 207. One end of the paper tray 208 is shown; the paper tray 208 is inserted from the right side of the main unit 201 in the figure. Sheets of recording paper (not shown) cut to a predetermined size are stacked on the paper tray 208. A plurality of paper trays 208 corresponding to a desired paper size can be set at the same time.

The facsimile machine can process image information read through the reader 205 and transmit the resultant image data to a destination facsimile machine or a similar image information processing apparatus through a communication cable (not shown). In addition, it can copy image information as the user operates the control panel 202. Also, the facsimile machine can receive image information from another facsimile machine or a similar image information processing apparatus through a communication cable and record the received image information on a recording paper. To copy or record image information, a recording paper is fed one by one from the paper tray 208 into the recorder 207, which then uses the image data to record images.

To record images, the recorder 207 comprises a photosensitive drum; a laser, a polygon mirror, and any other optical parts for scanning a laser beam in response to image data; and necessary parts such as a charge corotron, a transfer corotron, a developing unit, a cleaning unit, and a fixing unit (all not shown). The recording paper to which a toner image is transferred by the action of the transfer corotron is subjected to a fixing step by the fixing unit and is discharged onto a discharge tray 209 placed on the left side of the main unit 209 in the figure.

Figure 2:
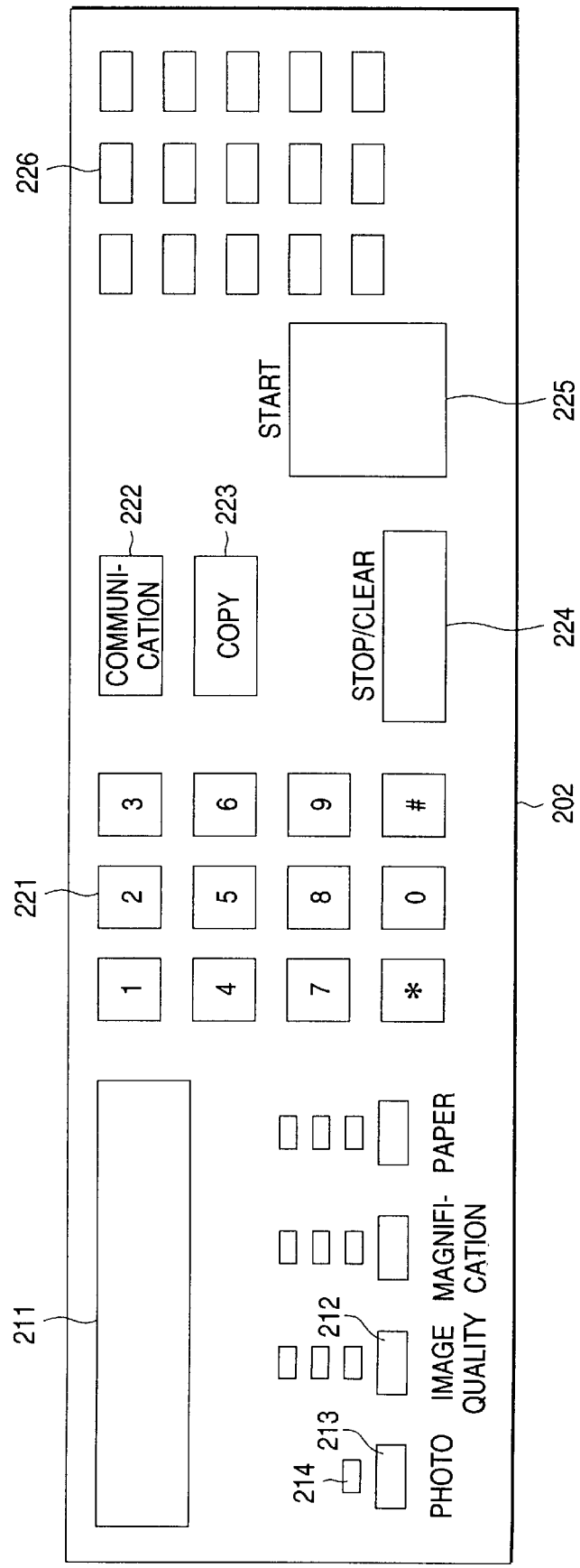
FIG. 2 is a plan view of a control panel of the facsimile machine in the first embodiment of the invention.

FIG. 2 shows a layout of various parts on the control panel. A display section 211 made of a liquid crystal display is placed in the upper left corner of the control panel 202. Various pieces of information are displayed in characters and graphics on the display section 211. A mode setting section 212 is placed below the display section 211. It is provided with four specification buttons 213 and one or more indicator lamps 214 placed corresponding to each of the specification buttons. When the user presses any one of the specification buttons 213, the indicator lamp 214 corresponding thereto is turned on. The specification buttons 213 consist of a photo mode on/off specification button, an image quality selection button, a magnification setting button, and a paper size specification button. To select image quality, each time the image quality selection button 213 is pressed, the "light," "normal," and "dark" indicator lamps 214 are turned on one at a time in order and the image density corresponding to the current indicator lamp turned on can be set. Of course, the image density may be able to be selected from among more density levels depending on the model.

A ten-key section 221 is placed to the right of the display section 211 and the mode setting section 212 and a communication button 222, a copy button 223, and a stop/clear button 224 are placed to the right of the ten-key section 221. The communication button 222 is used to select the communication mode among a copy mode in the present facsimile machine and a communication mode for transmitting image data to a destination. The copy button 223 is used to select the copy mode. The stop/clear button 224 is used to stop, for example, communication or copying being executed in the present facsimile machine or clear input data.

A start button 225 used to start the facsimile machine operation such as communication is placed to the right of the stop/clear button 224. One-touch keys 226 for selecting a destination with a single keystroke are placed at the right end of the control panel 202. To transmit image data to a destination not registered on the one-touch keys 226, dialing information should be entered with the ten keys of the ten-key section 221.

Figure 3:
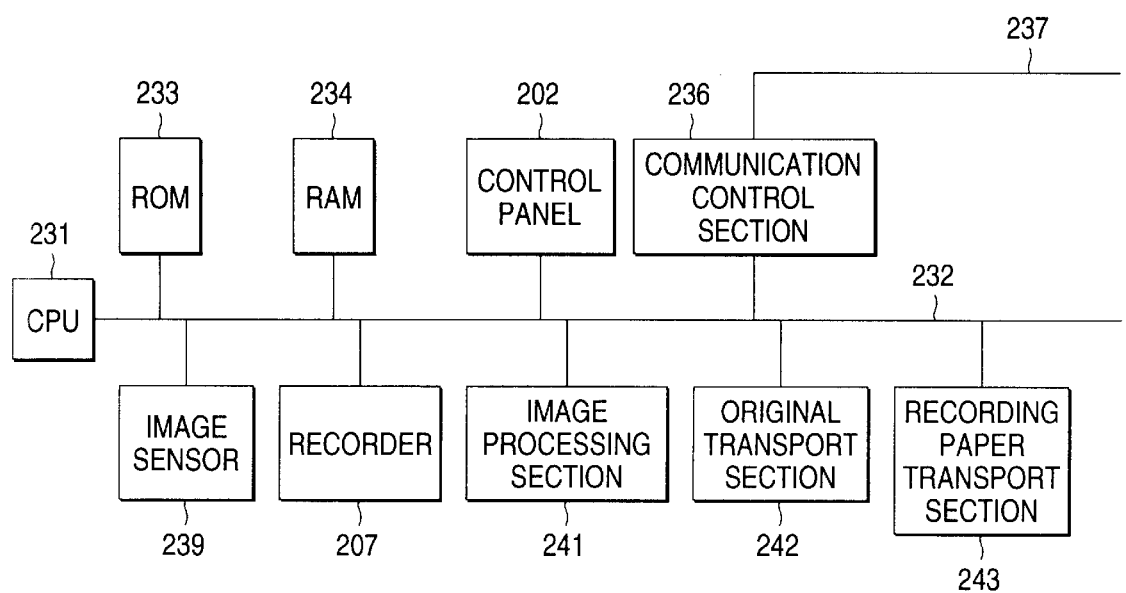
FIG. 3 is a block diagram to show the main part of the circuit configuration of the facsimile machine.

FIG. 3 shows the main part of the circuit configuration of the facsimile machine. The facsimile machine contains a CPU (central processing unit) 231 serving as the center of control. The CPU 231 is connected to other sections in the facsimile machine via a bus 232 such as a data bus. A ROM 233 (read-only memory) stores control programs of the facsimile machine and fixed data of a density conversion table, etc., for halftone processing by which the invention is characterized. A RAM 234 (random access memory) temporarily stores data required for control. We have already discussed the control panel 202. A communication control section 236 is a circuit part for transferring image data and control data to and from-image information processing apparatuses such as external facsimile machines through a communication cable 237. An image sensor 239 is housed in the reader 205 shown in FIG. 1 and reads an original document. We have already discussed the recorder 207.

An image processing section 241 is a circuit part for processing image information read through the image sensor and image data sent through the communication cable 237. An original document transport section 242 is a mechanical section for controlling transport of an original document, and a recording paper transport section 243 is a mechanical section for controlling transport of recording papers. An external storage such as a magnetic disk unit is not used in the embodiment, but can also be used to store necessary data of programs, etc., and image data.

Figure 4:
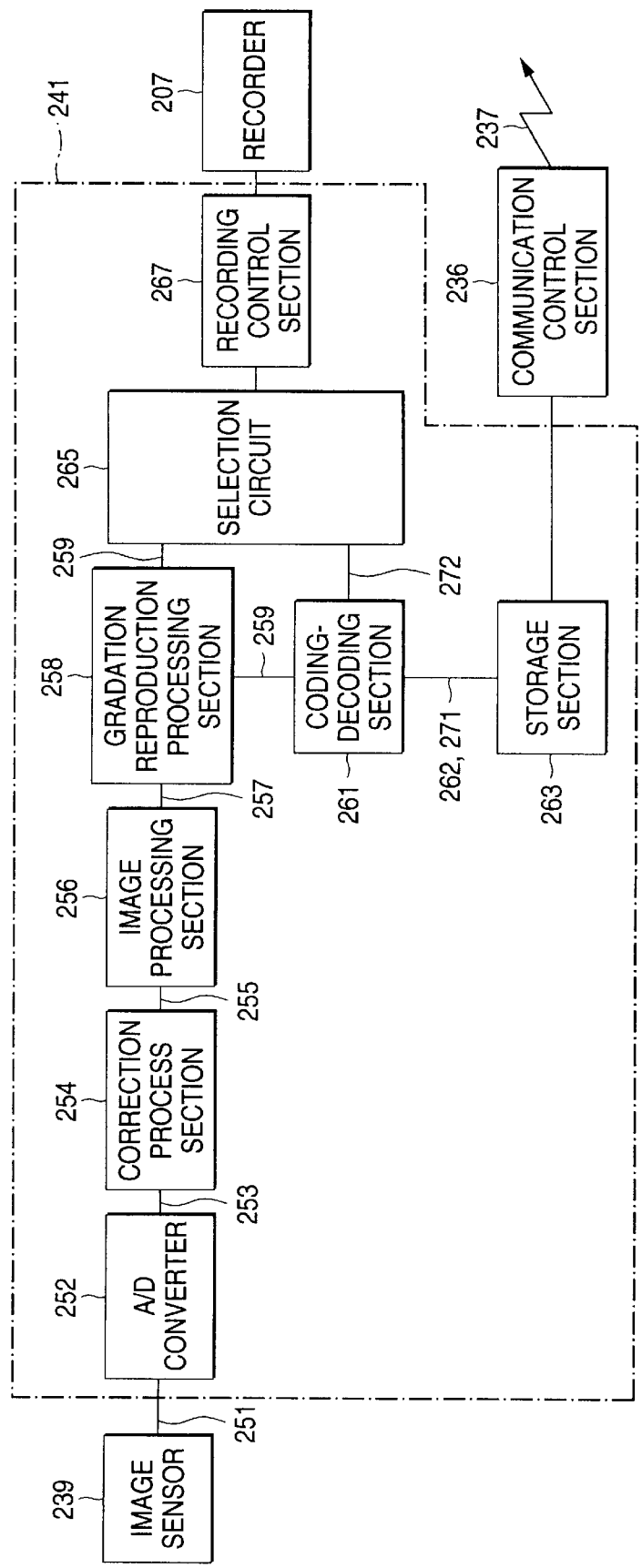
FIG. 4 is a block diagram to show details of an image processing section shown in FIG. 3 together with its peripheral circuitry.

FIG. 4 shows details of the image processing section together with its peripheral circuitry. The image sensor 239, which is a one-dimensional image sensor as already described, scans an original document and outputs analog image data 251 for each line to an A/D converter 252 in the image processing section 241. The A/D converter 252 converts the input analog image data 251 into digital image data 253 of 256 levels. The resultant digital image data 253 with one unit pixel represented by eight bits is sent to a correction process section 254.

The correction process section 254 makes a shading correction to the input digital image data 253 for correcting white and black levels. The resultant digital image data 255 is sent to an image processing section 256, which then performs desired image processing for the input digital image data 255. Specifically, it scales an image in the specified enlargement or reduction factor, enhances image edges, performs smoothing processing, etc. The resultant image data 257 processed by the image processing section 256 is sent to a gradation reproduction processing section 258, which then changes gradation based on the record characteristic of the recorder 207 of the facsimile machine and density specification from the control panel 202 and binarizes the image data 257, whereby the multivalued (continuous-tone) image data is converted into binary image data 259. This topic will be discussed in detail later.

The image data 259, as already described, may be sent to the recorder 207 in the present facsimile machine for copying an original document or may be sent to the communication control section 236 for transmission to an image information processing apparatus such as a destination facsimile machine through the communication cable 237. To send the image data 259 to the destination image information processing apparatus, the image data 259 is sent to a coding-decoding section 261, which then codes the image data. The resultant compressed image data 262 is sent to and stored in a storage section 263 forming a part of the RAM 234 shown in FIG. 3. Then, the image data is transmitted from the communication control section 236 through the communication cable 237.

In contrast, to make a copy in the present facsimile machine, the image data 259 is input to a selection circuit 265 through which the image data 259 is selected and sent to a record control section 267 which is a circuit part for controlling record of the recorder 207. Thus, the recorder 207 reproduces image information.

On the other hand, image data sent from an image information processing apparatus such as a facsimile machine (not shown) through the communication cable 237 is received at the communication control section 236 and is stored in the storage section 263. Image data 271 is read from the storage section 263 at a desired timing and is sent to the coding-decoding section 261, which then decodes the image data 271. The image data 272 thus decompressed is input to the selection circuit 265 through which the image data 272 is selected and sent to the record control section 267. Thus, the recorder 207 reproduces the image information sent from the other party.

Figure 5:
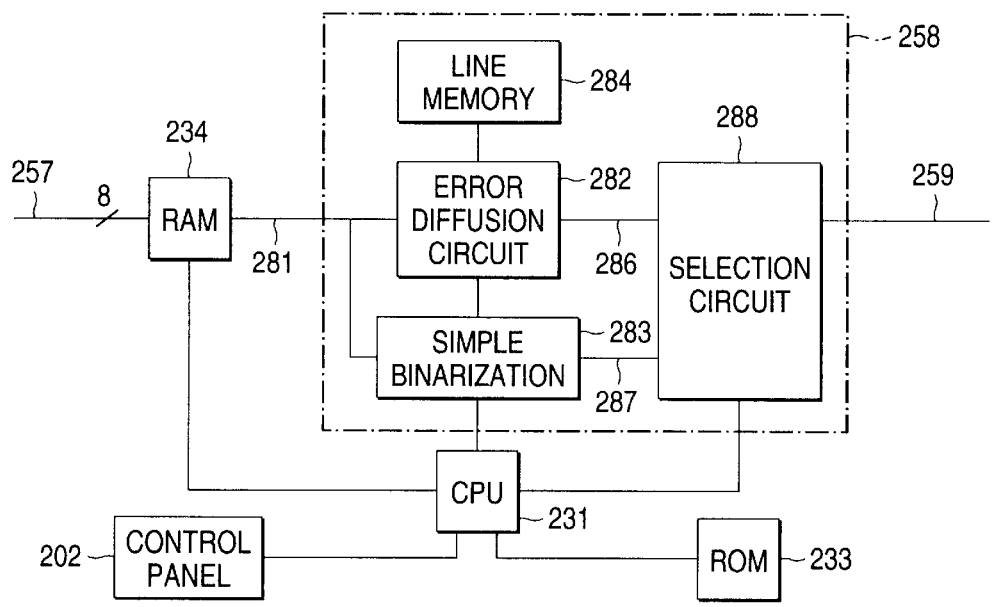
FIG. 5 is a block diagram to show a specific configuration of a gradation reproduction processing section placed in the image processing section together with its peripheral circuitry in the first embodiment of the invention.
Figure 19:
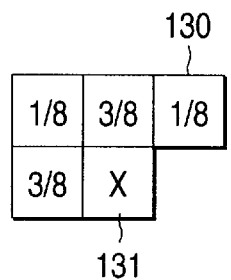
FIG. 19 is an illustration to show an example of an error diffusion process pattern.
Figure 20:
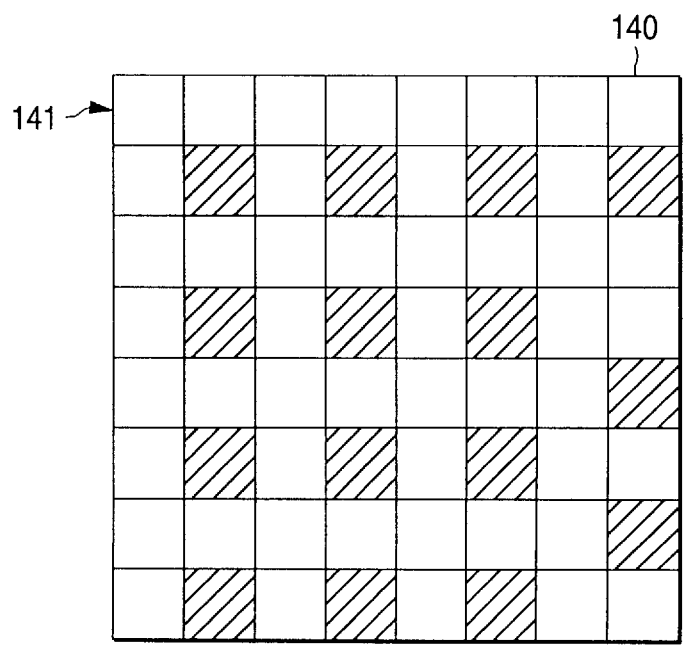
FIG. 20 is an illustration to represent a part of image data resulting from binarizing the image information of the original document shown in FIG. 16 using the error diffusion process pattern shown in FIG. 19.
Figure 21:
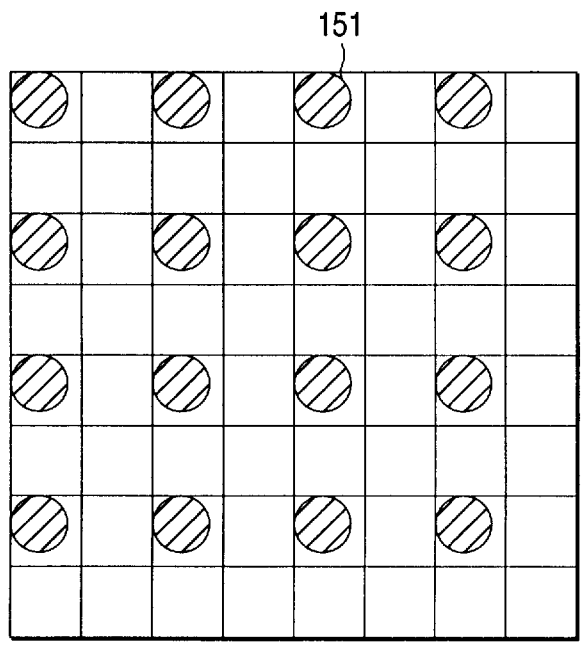
FIG. 21 is an enlarged illustration of an image to show the state of each dot when the image data shown in FIG. 18 is recorded by one recorder.
Figure 22:
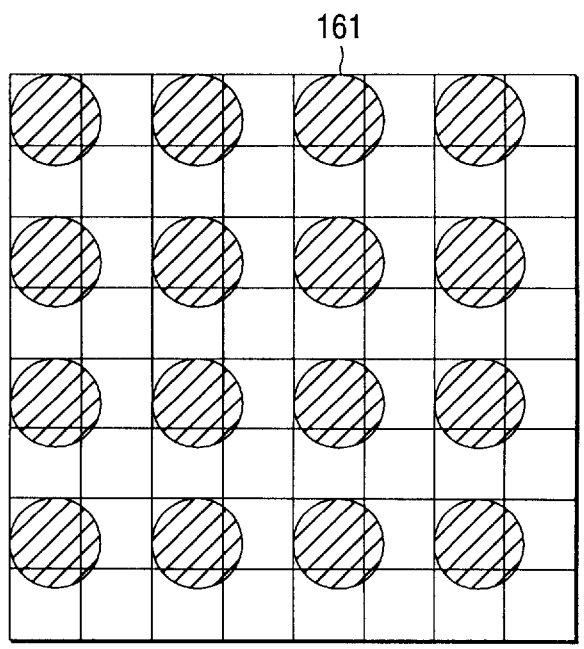
FIG. 22 is an enlarged illustration of an image to show the state of each dot when the image data shown in FIG. 18 is recorded by another recorder.

FIG. 5 shows a specific configuration of the gradation reproduction processing section placed in the image processing section together with its peripheral circuitry. The gradation reproduction processing section 258 is made up of an error diffusion circuit 282 and a simple binarization circuit 283 to which image data 281 read from the RAM 234 is input, a line memory 284 provided for the error diffusion circuit 282 to perform error delay processing (see FIG. 19), and a selection circuit 288 for selecting either of image data 286 and 287 output by the error diffusion circuit 282 and the simple binarization circuit 283 based on the specification contents and outputting image data 259 for every one bit. That is, when PHOTO of the specification button 213 is selected and its corresponding indicator lamp 214 is turned on, the image data 286 subjected to a false halftone process through the error diffusion- circuit 282 is selected; when any specification button other than PHOTO is selected and the indicator lamp 214 corresponding to PHOTO is off, the image data 287 output by the simple binarization circuit 283 is selected. Any specification button other than PHOTO is selected, for example, when an original document is made up of images consisting of only characters.

The CPU 231 controls the ROM 233 and the RAM 234 according to such operation contents of the control panel 202. That is, to perform error diffusion processing, the CPU 231 reads a necessary table among density conversion tables and stores the read table in the RAM 234 depending on which of the "light," "normal," and "dark" indicator lamps 214 on the control panel 202 is on and which of the communication buttons 222 and the copy button 223 is selected. When 8-bit parallel image data 257 is input to the RAM 234, the levels of data of 256 levels are again adjusted according to the density conversion table. The adjusted image data is sent to the error diffusion circuit 282 and the unadjusted image data contents are sent to the simple binarization circuit 283. Of course, depending on the apparatus, the image data adjusted according to the density conversion table may be sent to both the error diffusion circuit 282 and the simple binarization circuit 283.

Figure 6:
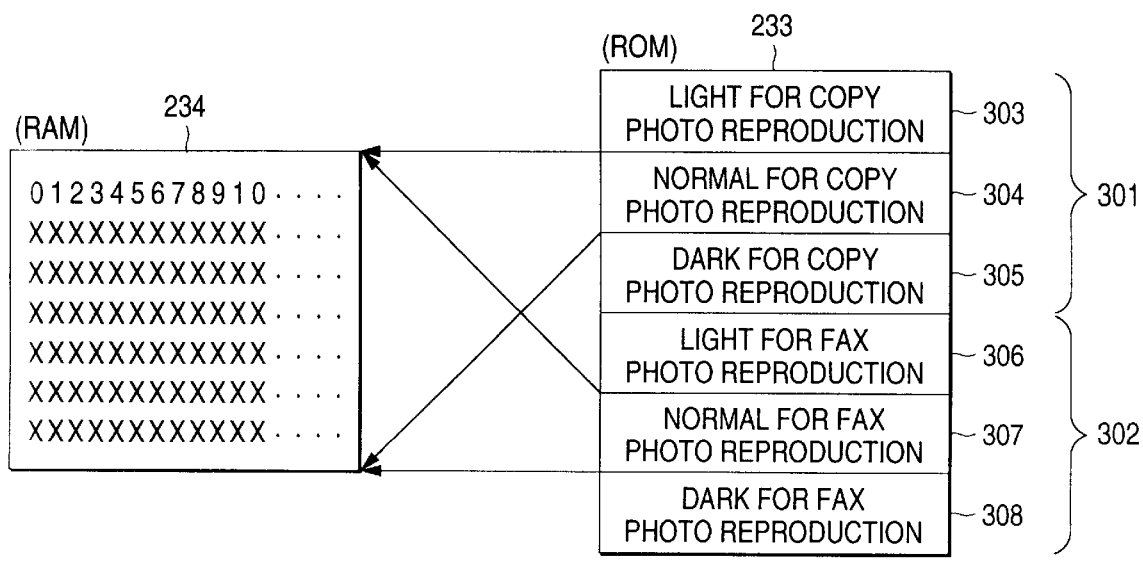
FIG. 6 is an illustration to represent density conversion tables in a ROM and a state in which one of the tables is stored in a RAM in the first embodiment of the invention.

FIG. 6 represents density conversion tables in the ROM and a state in which one of the tables is stored in the RAM. A copy selection table area 301 and a facsimile (FAX) selection table area 302 are provided in the ROM 233; density conversion tables 303–308 corresponding to the "light," "normal," and "dark" indications on the control panel 202 are placed in the two areas (three tables each). The density conversion tables 303–305 stored in the copy selection table area 301 are tables for reproducing image information in the "light," "normal," and "dark" modes when the recorder 207 of the present facsimile machine executes recording. Since the facsimile machine of the embodiment uses a laser printer mechanism for the recorder 207, the black dot diameters tend to become large. Then, while the levels converted into density data of 256 levels by the A/D converter 252 in FIG. 4 are corrected in the direction of slightly decreasing the density, the density levels are corrected so that the "light," "normal," or "dark" density is reproduced.

In contrast, the density conversion tables 306–308 stored in the facsimile (FAX) selection table area 302 are tables for reproducing image information in the "light," "normal," and "dark" modes when a standard recorder executes recording. At the facsimile transmission time, the record characteristic of the recorder of an image information processing apparatus such as a destination facsimile machine is basically unknown. Thus, in transmission to an external apparatus, the other recorder is assumed to be a standard recorder except that the record characteristic of the other recorder is known, and the density conversion tables are set so that image information is reproduced in the "light," "normal," and "dark" modes.

The CPU 231 (FIG. 5) selects one among the six density conversion tables 303–308 and stores the contents of the selected table in the RAM 234.

Figure 7:
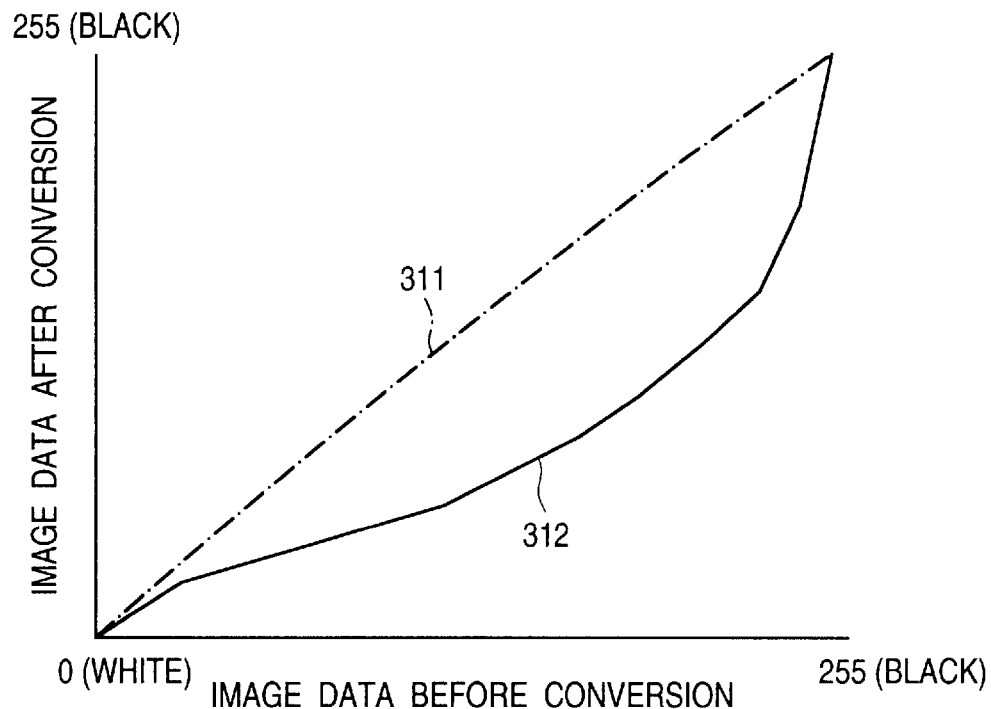
FIG. 7 is a conversion characteristic chart to represent general relationship between image data before conversion and image data after conversion in each density conversion table shown in FIG. 6 in a "normal" record mode.

FIG. 7 represents general relationship between image data before conversion and image data after conversion in each density conversion table shown in FIG. 6 in the "normal" record mode. Image data 257 input to the RAM 234 in FIG. 5 is data of 256 levels from 0 (white) to 255 (black) and indicated on the horizontal axis of the graph. The vertical axis indicates image data after conversion, input to the error diffusion circuit 282. Alternate long and short dash line 311 indicates the contents of the density conversion table 307 in transmission to an image information processing apparatus such as a facsimile machine; the contents before conversion match those after conversion. In contrast, solid line 312 indicates the contents of the density conversion table 304 when the recorder 207 of the present facsimile machine performs processing; an adjustment is made so as to decrease the density as a whole.

In the density conversion table 306 for decreasing the density in transmission to an image information processing apparatus such as a facsimile machine, a conversion characteristic close to the solid line 312 is selected. In the density conversion table 308 opposite to that table, a conversion characteristic close to a line drawing such that the solid line 312 is moved to the symmetrical position with respect to the alternate long and short dash line 311 is selected. For other density conversion tables 303 and 305 for the recorder of the present facsimile machine or recorders having the same record characteristic as the present facsimile machine, numeric value conversion for density conversion is also executed on a similar principle.

Figure 8:
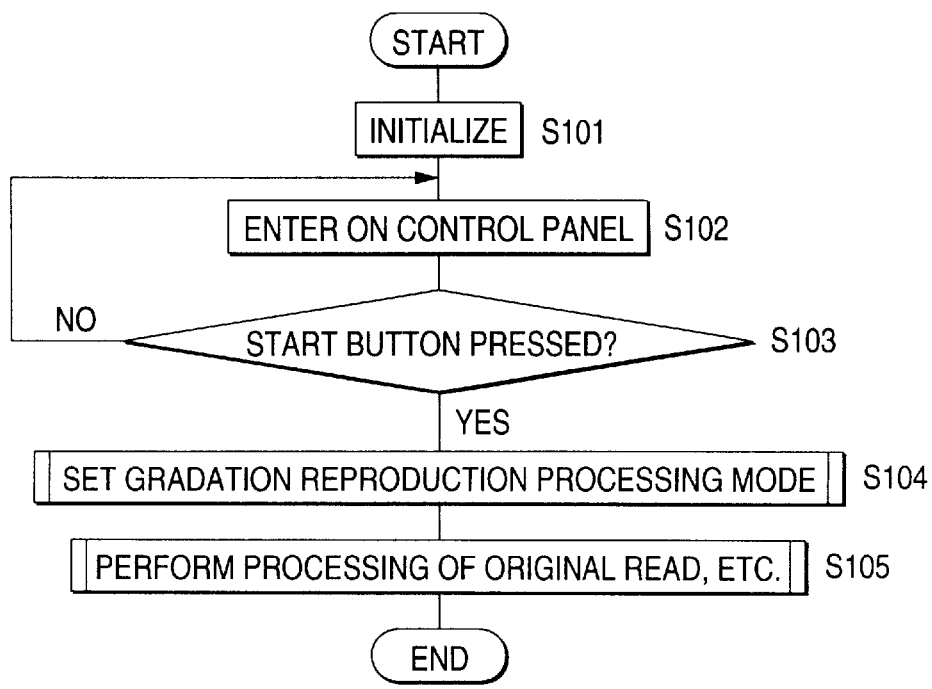
FIG. 8 is a flowchart to show an outline of general control for the facsimile machine of the first embodiment to make a copy or transmit image data.

FIG. 8 shows an outline of general control for the facsimile machine of the first embodiment to make a copy or transmit image data. When the power of the facsimile machine is turned on, the facsimile machine is initialized at step S101 and waits for the operator to enter a command on the control panel 202 at step S102. If the operator presses the start button 225 shown in FIG. 2 at step 103 in this state, the gradation reproduction processing mode is set at step S104 and the subsequent processing of original document read, etc., is performed at step S105.

Figure 9:
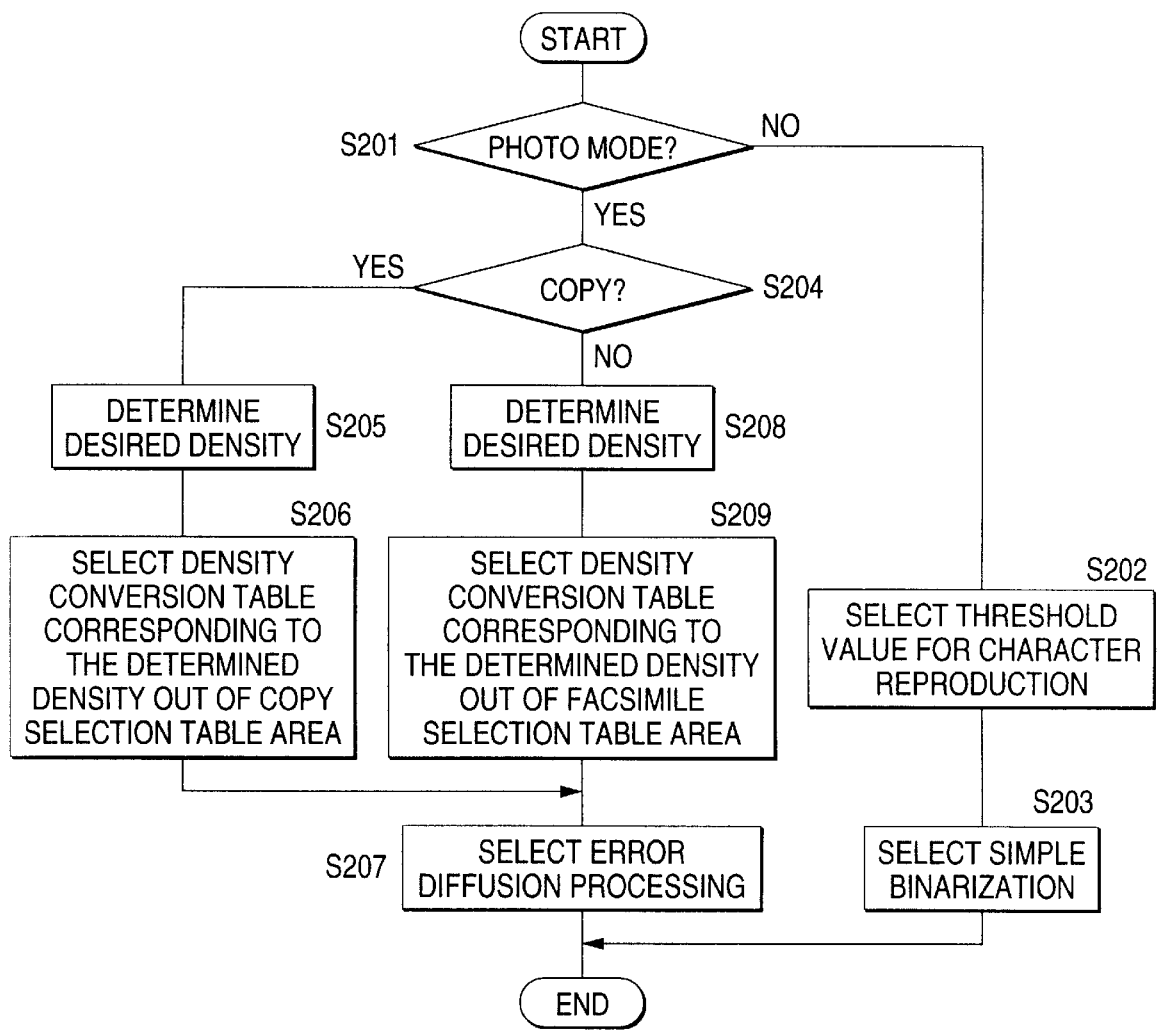
FIG. 9 is a flowchart to specifically show the control contents of a gradation reproduction processing mode at step S104 in FIG. 8.

FIG. 9 specifically shows setting of the gradation reproduction processing mode at step S104 in FIG. 8. The CPU 231 shown in FIG. 3 or 5 checks the control panel 202 for the setup contents to see if the PHOTO mode, namely, halftone processing mode is selected at step S201. If the PHOTO mode is not selected at step S201, a threshold value for character reproduction corresponding to each density selection for the simple binarization circuit 283 (FIG. 5) is selected at step S202 and the selection circuit 288 is set so as to select image data 287 output by the simple binarization circuit 283 at step S203.

On the other hand, if the PHOTO mode is selected at step S201, whether or not the copy button 223 is selected among the communication button 222 and the copy button 223 shown in FIG. 2 is checked at step S204. If the copy button 223 is selected at step S204, which density of "light," "normal," and "dark" is selected is determined at step S205 and one table corresponding to the selected density is selected among the density conversion tables 303–305 stored in the copy selection table area 301 shown in FIG. 6 at step S206. The contents of the selected table are set in the RAM 234 and the selection circuit 288 is set so as to select image data 286 for error diffusion processing at step S207.

In contrast, if the communication button 222 is selected at step S204, which density of "light," "normal," and "dark" is selected is determined at step S208 and one table corresponding to the selected density is selected among the density conversion tables 306–308 stored in the FAX selection table area 302 shown in FIG. 6 at step S209. The contents of the selected table are set in the RAM 234 and the selection circuit 288 is set so as to select image data 286 for error diffusion processing at step S207.

Figure 10:
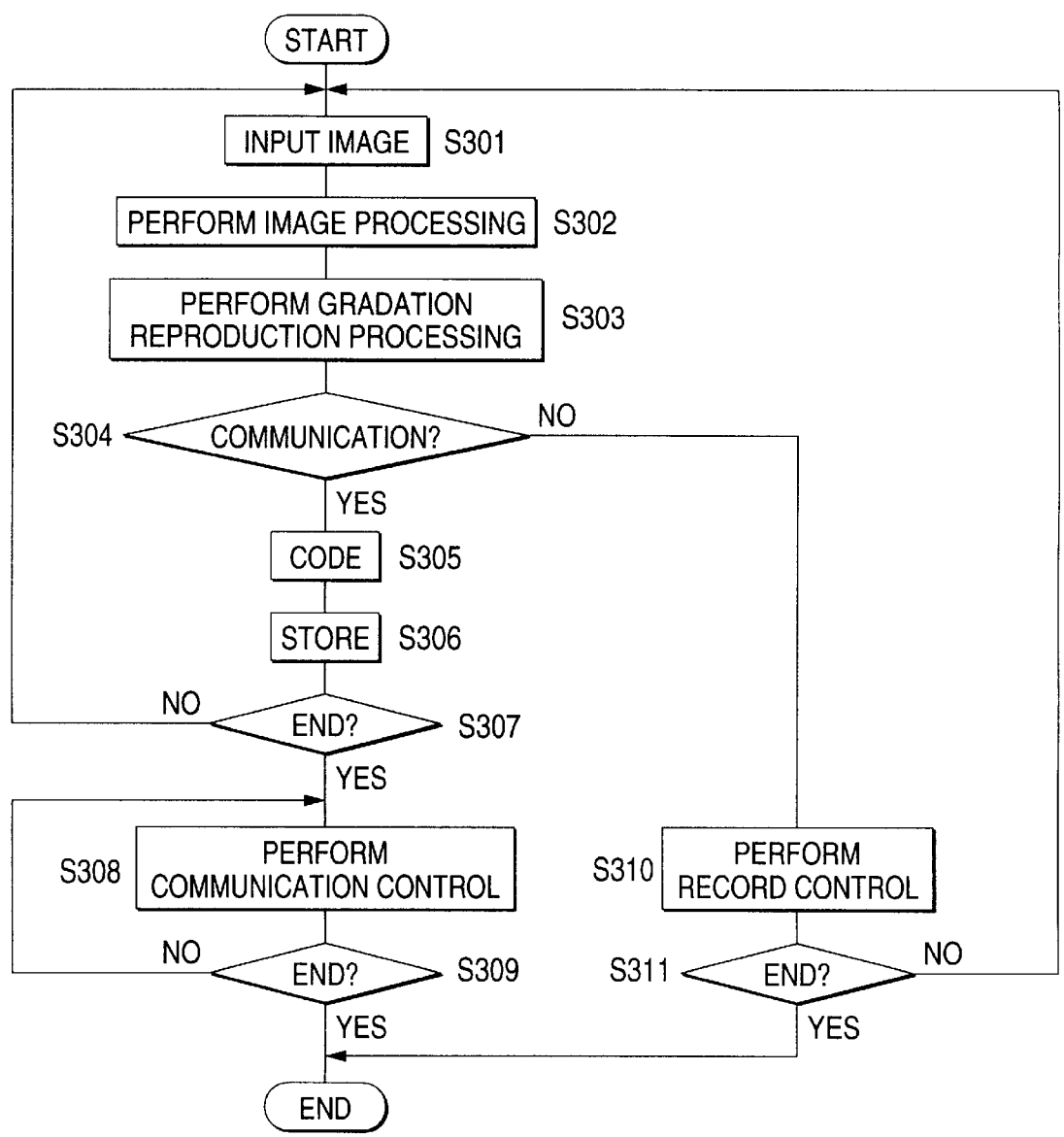
FIG. 10 is a flowchart to specifically show the subsequent processing of original document read, etc., at step S105 in FIG. 8.

FIG. 10 specifically shows the subsequent processing of original document read, etc., at step S105 in FIG. 8. First, image data input is started at step S301 through reading of an original document sent out from the original document placement support 203 shown in FIG. 1, and image processing as shown in FIG. 4 is performed for image data in a predetermined unit at step S302, then gradation reproduction processing is performed according to the gradation reproduction processing mode set in FIG. 9 at step S303. Then, the CPU 231 checks whether or not the communication button 222 is selected at step S304. If the communication button 222 is selected, coding is performed by the coding/decoding section 261 shown in FIG. 4 at step S305. The coded image data 262 is stored in the storage section 263 at step S306.

The CPU 231 checks whether or not the original document read ends in the state at step S307. If the original document read does not end, control returns to step S301 and steps S301–S307 (read and processing of the subsequent image information) are repeated.

If all the image data 261 is thus stored in the storage section 263 at step S307, communication control for sending the image data to the destination is started at step S308. If the communication control of the communication control section 236 ends at step S309, a sequence of the steps from original document read to transmission is complete.

In contrast, if the copy button 223 (FIG. 2) is selected at step S304, the recorder 207 of the present facsimile machine executes recording. Then, image data is sent in a predetermined unit at a time to the record control section 267 and record control is performed at step S310. Whether or not the record control ends is determined at step S311. If the record control does not end, control returns to step S301 and steps S301–S304 are repeated. If image data for recording runs out and the record control ends at step S311, the copying is complete.

As described above, in the first embodiment, halftone is reproduced by error diffusion and to record image data by an apparatus other than the present apparatus, the image data is converted into image data having a standard density characteristic and the resultant data is transmitted. Thus, even if the record characteristic of the present apparatus is contradictory to that of an image information processing apparatus such as a destination facsimile machine, reproduction of an image with image quality extremely degraded can be prevented.

Second embodiment

Figure 11:
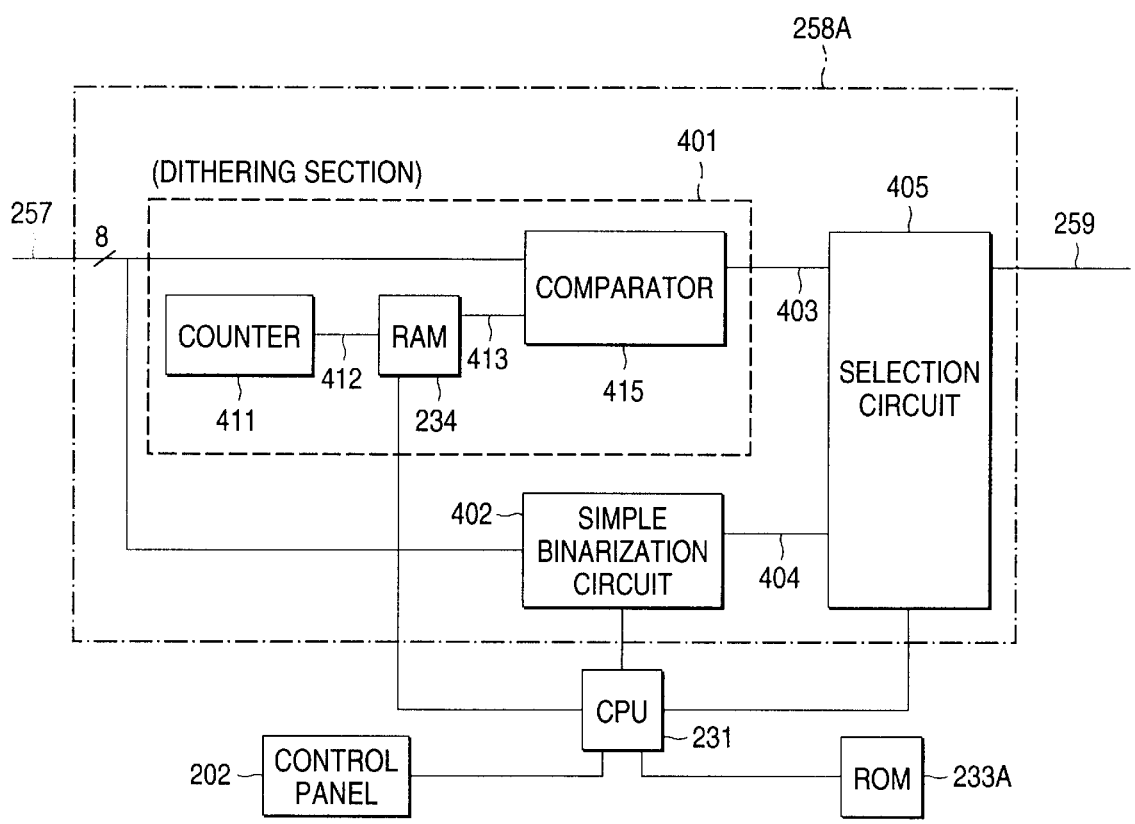
FIG. 11 is a block diagram to show a specific configuration of a gradation reproduction processing section placed in an image processing section together with its peripheral circuitry in a facsimile machine in a second embodiment of the invention.

FIG. 11 shows a specific configuration of a gradation reproduction processing section placed in an image processing section together with its peripheral circuitry in a facsimile machine in a second embodiment of the invention. The facsimile machine of the second embodiment is the same as that of the first embodiment in basic functional sections except false halftone processing, density conversion table selection, etc. Therefore, FIGS. 1–4 are also used in the second embodiment. However, the gradation reproduction processing section 258 in FIG. 5 is represented as a gradation reproduction processing section 258A in the second embodiment and the ROM 233 in FIG. 5 is also represented as a ROM 233A.

The gradation reproduction processing section 258A comprises a dithering section 401 and a simple binarization circuit 402 to which 8-bit image data output from image processing section 256 shown in FIG. 4 is input. Image data 403 and image data 404 processed by the dithering section 401 and the simple binarization circuit 402 are input to a selection circuit 405, which then selects either the image data 403 or 404 for output as serial image data 259 for every one bit. The CPU 231 performs control as the user operates a control panel 202. The ROM 233A stores programs as control procedures of the CPU 231. The CPU 231 controls the simple binarization circuit 402 and the selection circuit 405 and rewrites the contents of a RAM 234 whenever necessary in response to the control contents.

Figures 17, 18:
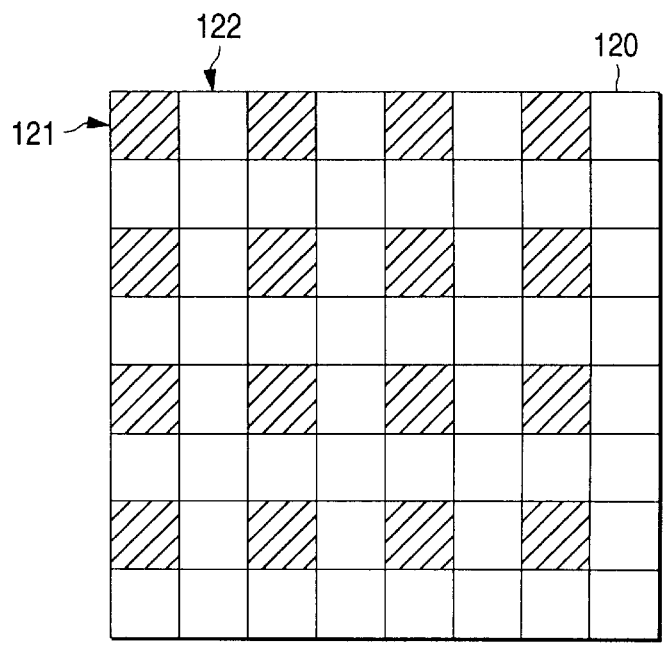
FIG. 17 is an illustration to represent one example of threshold values of a dither matrix.
FIG. 18 is an illustration to represent a part of image data resulting from binarizing the image information of the original document shown in FIG. 16 using the dither matrix shown in FIG. 17.

The dithering section 401 is a section for performing false halftone processing with an 8×8 dither matrix similar to that shown in FIG. 17. The dithering section is made up of a ring-counter 411 for specifying a position in the matrix, a RAM 234 for reading out 64 threshold value data pieces 413 by changing the data pieces one by one for each unit pixel in response to address information 412 output from the ring counter 411, and a comparator 415 for comparing the image data 257 with the threshold value data 413 and outputting binarized image data 403 in order.

The simple binarization circuit 402 as another circuit to which the image data 257 is input, executes binarization based on threshold values common to unit pixels specified by the CPU 231 and sends the resultant image data 404 to the selection circuit 405 in parallel with the image data 257. The selection circuit 405 selects either of the image data 403 and 404 depending on whether or not false halftone processing is to be performed, and outputs the selected image data as image data 259.

Figure 12:
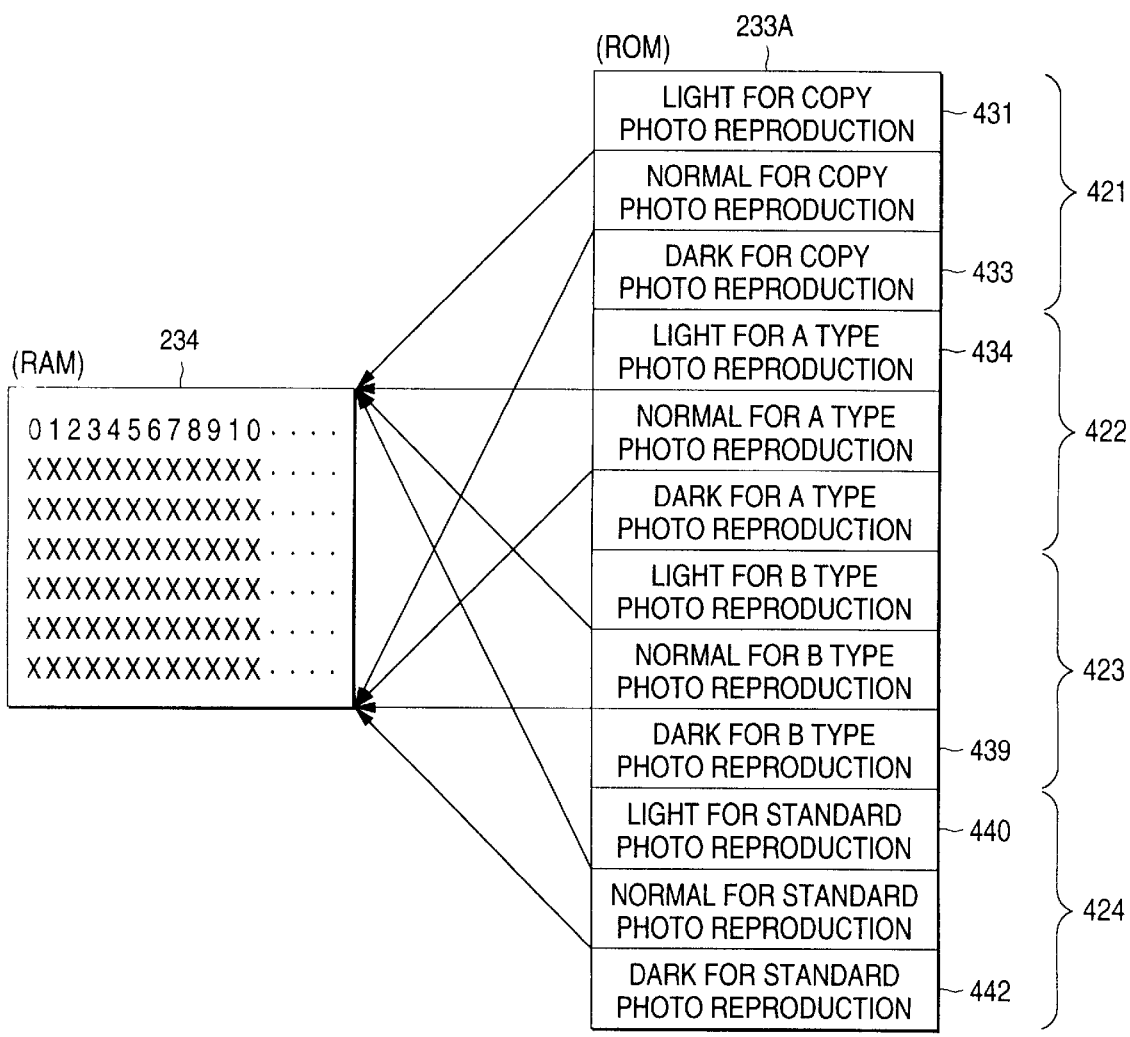
FIG. 12 is an illustration to represent a principle for storing density conversion tables stored in a ROM into a RAM.

FIG. 12 represents a principle for storing density conversion tables stored in the ROM into the RAM. The ROM 233A is provided with four areas of a copy selection table area 421, an A-type model communication selection table area 422, a B-type model communication selection table area 423, and a standard communication selection table area 424 apart from a program storage area. Density conversion tables 431–442 are placed in the areas 421–424 (three each). The concept of the copy selection table area 421 is similar to that of the copy selection table area 301 in the first embodiment. The standard communication selection table area 424 is the same as the facsimile (FAX) selection table area 302 in the first embodiment. However, the density conversion tables 431–433 and 440–442 differ completely from the density conversion tables 303–308 in the first embodiment in that they store threshold values for the dither matrix.

The A-type model communication selection table area 422 is provided for image information apparatuses to which image data is transmitted if the apparatuses tend to record in slightly high density than standard apparatuses. In contrast, the B-type model communication selection table area 423 is provided for image information apparatuses to which image data is transmitted if the apparatuses tend to record in slightly low density than standard apparatuses. The density conversion tables 434–439 are placed so as to correspond to the "light," "normal," and "dark" modes for the areas.

Figure 13:
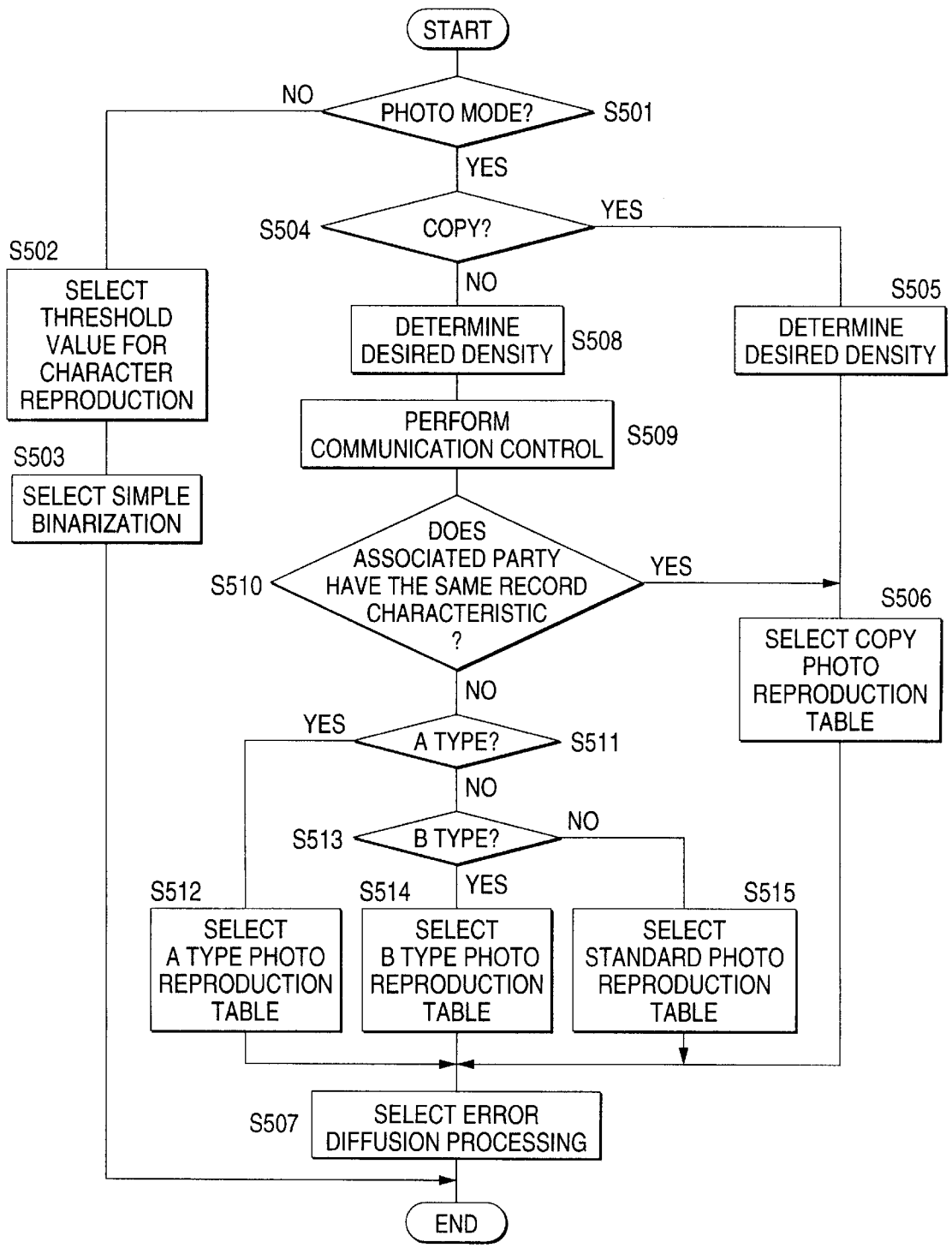
FIG. 13 is a flowchart to specifically show setting of a gradation reproduction processing mode in the facsimile machine in the second embodiment of the invention.

FIG. 13 specifically shows setting of a gradation reproduction processing mode in the facsimile machine in the second embodiment of the invention. In the second embodiment, the control in FIG. 8 in the first embodiment is used as it is.

The CPU 231 shown in FIG. 3 or 5 checks the control panel 202 for the setup contents to see if the PHOTO mode, namely, halftone processing mode is selected at step S501. If the PHOTO mode is not selected at step S501, a threshold value for character reproduction corresponding to each density selection for the simple binarization circuit 402 (FIG. 11) is selected at step S502 and the selection circuit 405 is set so as to select image data 404 output by the simple binarization circuit 402 at step S503.

On the other hand, if the PHOTO mode is selected at step S501, whether or not the copy button 223 is selected among the communication button 222 and the copy button 223 shown in FIG. 2 is checked at step S504. If the copy button 223 is selected, which density of "light," "normal," and "dark" is selected is determined at step S505 and one table corresponding to the selected density is selected among the density conversion tables 431–433 stored in the copy selection table area 421 shown in FIG. 12 at step S506. The contents of the selected table are set in the RAM 234 and the selection circuit 405 is set so as to select image data 403 for dithering at step S507.

In contrast, if the communication button 222 is selected at step S504, which density of "light," "normal," and "dark" is selected is determined at step S508 and communication control with the destination image information processing apparatus such as a facsimile machine is performed at step S509. If the identification data of the recorder of the destination image information processing apparatus can be interpreted like the recorder in the apparatus made by the same company, it is interpreted for determining whether or not the destination image information processing apparatus has the same record characteristic as the present apparatus at step S510. As a result, if it is determined that the destination image information processing apparatus has the same record characteristic as the present apparatus, control goes to step S506 at which one table corresponding to the selected density is selected among the density conversion tables 431–433 stored in the copy selection table area 421 shown in FIG. 12. The contents of the selected table are set in the RAM 234 and the selection circuit 405 is set so as to select image data 403 for dithering at step S507.

On the other hand, if the associated image information processing apparatus does not have the same record characteristic as the present apparatus at step S510, data indicating the record characteristic such as the model name, the recorder name, the recording system, etc., is retrieved in a record characteristic determination table (not shown) in the ROM 233A and whether or not the recording characteristic belongs to the A-type explained in FIG. 12 is determined at step S511. If it is determined that the recorder for recording belongs to the A-type, one table corresponding to the selected density is selected among the density conversion tables 434–436 stored in the A-type model communication selection table area 422 shown in FIG. 12 at step S512. Then, the contents of the selected table are set in the RAM 234 and the selection circuit 405 is set so as to select image data 403 for dithering at step S507.

If it is not determined that the recorder for recording belongs to the A-type at step S511, whether or not it belongs to the B-type is determined at step S513. If it is determined that the recorder for recording belongs to the B-type, one table corresponding to the selected density is selected among the density conversion tables 437–439 stored in the B-type model communication selection table area 423 shown in FIG. 12 at step S514. Then, the contents of the selected table are set in the RAM 234 and the selection circuit 405 is set so as to select image data 403 for dithering at step S507.

If it is not determined that the recorder for recording belongs to the B-type at step S513, the other image processing apparatus does not have the same record characteristic as the present apparatus and is not A-type or B-type. Thus, it can be the standard type or the data concerning the record characteristic cannot be interpreted and what the record characteristic is cannot be determined. Then, in this case, one table corresponding to the selected density is selected among the density conversion tables 440–442 stored in the standard communication selection table area 424 shown in FIG. 12 at step S515. Then, the contents of the selected table are set in the RAM 234 and the selection circuit 405 is set so as to select image data 403 for dithering at step S507, and the process is terminated.

In the second embodiment described above, halftone reproduction is executed by dithering and if image data is recorded by an apparatus other than the present apparatus, the record characteristic of the other apparatus is checked. If it can be interpreted, the image data is converted into image data of the most appropriate record characteristic and the resultant image data is transmitted, so that record with good image quality can be provided. Since image data of the same record characteristic as the present apparatus is transmitted to an apparatus having the same record characteristic like the same model, image information with the same image quality can be reproduced.

First modified example of second embodiment

In a first modified example of the second embodiment, a first dither matrix previously optimized to the black dot diameter in recorder 207 (see FIG. 4) of the present apparatus and a second dither matrix optimized to the standard black dot diameter responsive to resolution are stored in ROM 233A (see FIG. 11). When the recorder 207 of the present apparatus is used for copying, the first dither matrix is used. When communication control section 236 is used to transmit image data to another image information processing apparatus such as a facsimile machine as in facsimile communication, the second dither matrix is used.

In the modified example, a dithering section 401 as in FIG. 11 is also used. To record image data at 64 levels, the required capacity of RAM 234 is 64 bytes. Since dithering serves as both a gradation conversion process and a binary image generation process, RAM for density conversion tables becomes unnecessary.

Figure 14:
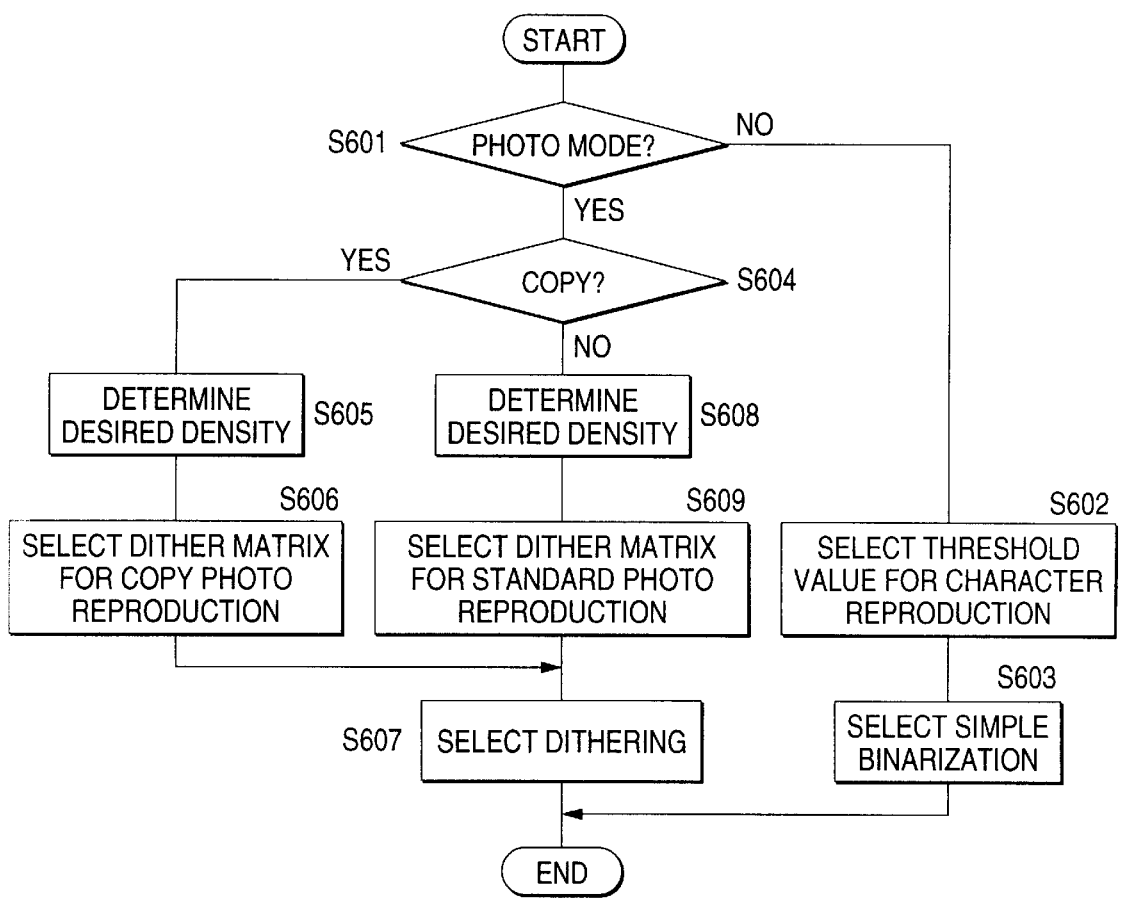
FIG. 14 is a flowchart to show setting of a gradation reproduction processing mode in a first modified example of the second embodiment.

FIG. 14 shows setting of a gradation reproduction processing mode in the first modified example. The CPU 231 shown in FIGS. 3 or 5 checks control panel 202 for the setup contents to see if a PHOTO mode, namely, halftone processing mode is selected at step S601. If the PHOTO mode is not selected at step S601, a threshold value for character reproduction corresponding to each density selection for the simple binarization circuit 402 (FIG. 11) is selected at step S602 and selection circuit 405 is set so as to select image data 404 output by the simple binarization circuit 402 at step S603.

On the other hand, if the PHOTO mode is selected at step S601, whether or not the copy button 223 is selected among the communication button 222 and the copy button 223 shown in FIG. 2 is checked at step S604. If the copy button 223 is selected, which density of "light," "normal," and "dark" is selected is determined at step S605 and one table corresponding to the selected density is selected among the density conversion tables 431–433 stored in the copy selection table area 421 shown in FIG. 12 at step S606. The contents of the selected table are set in the RAM 234 and the selection circuit 405 is set so as to select image data 403 for dithering at step S607.

In contrast, if the communication button 222 is selected at step S604, which density of "light," "normal," and "dark" is selected is determined at step S608 and one table corresponding to the selected density is selected among the density conversion tables 440–442 stored in the standard communication selection table area 424 at step S609. Then, the contents of the selected table are set in the RAM 234 and the selection circuit 405 is set so as to select image data 403 for dithering at step S607, and the process is terminated.

Second modified example of second embodiment

In a second modified example of the second embodiment, a first dither matrix previously optimized to the black dot diameter in recorder 207 (see FIG. 4) of the present apparatus and a second dither matrix optimized to the standard black dot diameter responsive to resolution are stored in ROM 233A (see FIG. 11). When the recorder 207 of the present apparatus is used for copying, the first dither matrix is used. When communication control section 236 is used to transmit image data to another image information processing apparatus such as a facsimile machine as in facsimile communication, the second dither matrix is used. The second modified example differs from the first modified example only in mode setting procedure.

Figure 15:
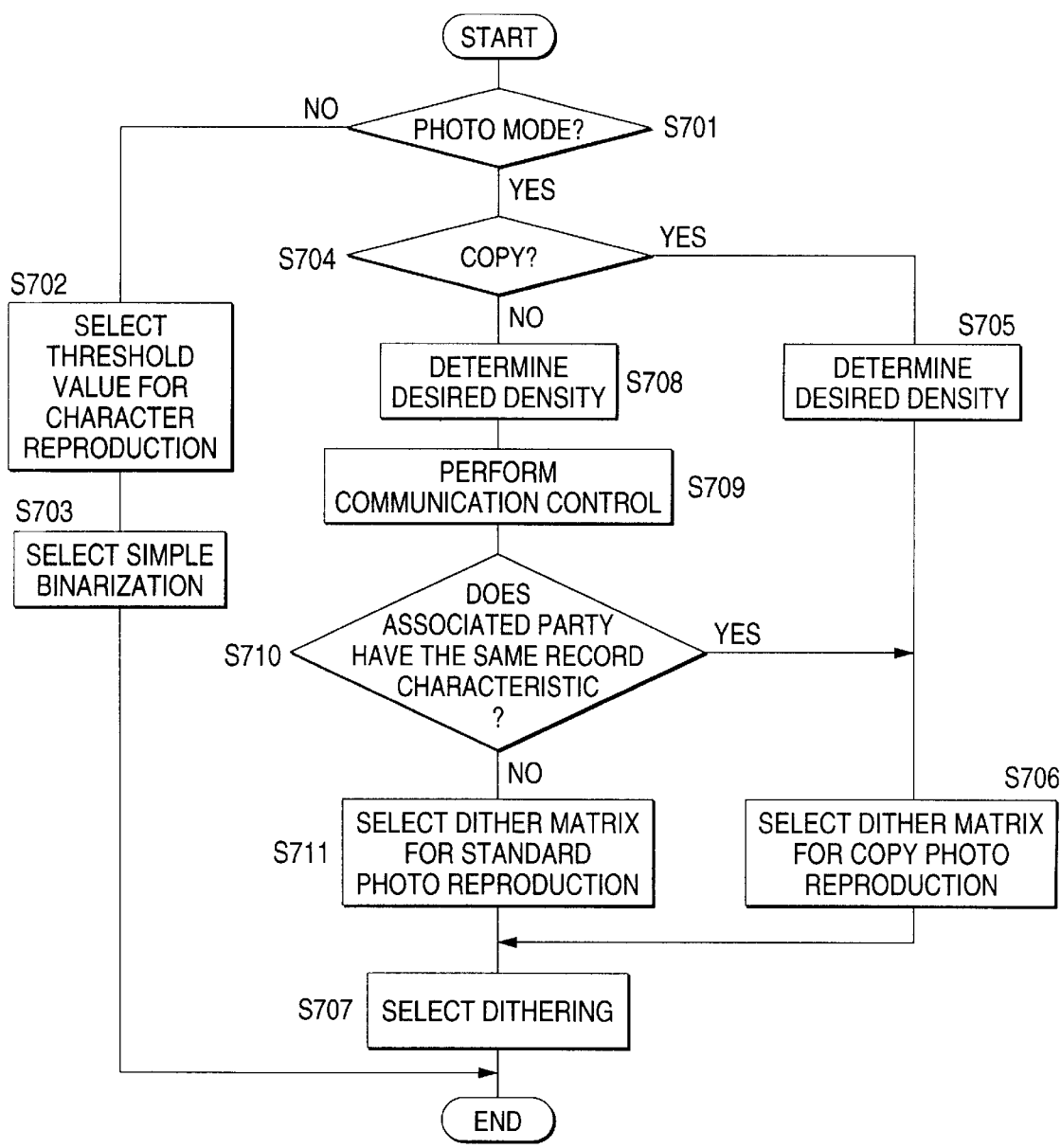
FIG. 15 is a flowchart to show setting of a gradation reproduction processing mode in a second modified example of the second embodiment.

FIG. 15 shows setting of a gradation reproduction processing mode in the second modified example. The CPU 231 shown in FIGS. 3 or 5 checks control panel 202 for the setup contents to see if a PHOTO mode, namely, halftone processing mode is selected at step S701. If the PHOTO mode is not selected at step S701, a threshold value for character reproduction corresponding to each density selection for the simple binarization circuit 402 (FIG. 11) is selected at step S702 and selection circuit 405 is set so as to select image data 404 output by the simple binarization circuit 402 at step S703.

On the other hand, if the PHOTO mode is selected at step S701, whether or not the copy button 223 is selected among the communication button 222 and the copy button 223 shown in FIG. 2 is checked at step S704. If the copy button 223 is selected, which density of "light," "normal," and "dark" is selected is determined at step S705 and one table corresponding to the selected density is selected among the density conversion tables 431–433 stored in the copy selection table area 421 shown in FIG. 12 at step S706. The contents of the selected table are set in the RAM 234 and the selection circuit 405 is set so as to select image data 403 for dithering at step S707.

In contrast, if the communication button 222 is selected at step S704, which density of "light," "normal," and "dark" is selected is determined at step S708 and communication control with the destination image information processing apparatus such as a facsimile machine is performed at step S709. If the identification data of the recorder of the destination image information processing apparatus can be interpreted like the recorder in the apparatus made by the same company, it is interpreted for determining whether or not the destination image information processing apparatus has the same record characteristic as the present apparatus at step S710. As a result, if it is determined that the destination image information processing apparatus has the same record characteristic as the present apparatus, control goes to step S706 at which one table corresponding to the selected density is selected among the density conversion tables 431–433 stored in the copy selection table area 421 shown in FIG. 12. The contents of the selected table are set in the RAM 234 and the selection circuit 405 is set so as to select image data 403 for dithering at step S707.

On the other hand, if it is not determined at step S710 that the other image information processing apparatus has the same record characteristic as the present apparatus, one table corresponding to the selected density is selected among the density conversion tables 440–442 stored in the standard communication selection table area 424 shown in FIG. 12 at step S711. Then, the contents of the selected table are set in the RAM 234 and the selection circuit 405 is set so as to select image data 403 for dithering at step S707, and the process is terminated.

In the first example discussed above, the density conversion tables are stored in relation to areas in the ROM. However, if there are a plurality of density conversion tables having the identical or similar record characteristic as a result, they may be shared, of course. This also applies to the second example. According to this, the capacity of the storage means such as the ROM can be decreased.

In the second example, the non-storage type technique is shown. However, gradation conversion processing and binary image generation processing are performed in parallel and the image data optimized to the present apparatus and the image data optimized to the standard model are stored, then either of them can also be transmitted by performing communication control. In this configuration, the read operation is immediately performed, thus the user wait time does not occur.

As described above, in the invention of the first aspect, means for previously storing a plurality of density conversion characteristics required when the false halftone processing is performed is provided. A desired density conversion characteristic is selected in response to which of display destinations for displaying, recording, etc., are used to display the image, and the image data is sent to the display destination. Therefore, for example, when the image data is transmitted to such a display destination as decreases the density at the display time, a density conversion characteristic to increase the density is selected and false halftone processing is performed, thereby preventing the image display (record) density from greatly differing.

Also, according to the invention of the second aspect, means for previously storing a plurality of density conversion characteristics required when the false halftone processing is performed is provided. The record characteristic of the display destination for displaying or recording the image is determined and one is selected among the density conversion characteristics stored in the density conversion characteristic storage means in response to the determination result. The image data for which the false halftone processing has been performed according to the selected density conversion characteristic is sent to the display destination where the image data should be displayed. Therefore, for example, when image data is transmitted to a recorder of an apparatus different from the present apparatus, the record characteristic of the recorder can be known and the image data set to the gradation responsive to the record characteristic can be sent. The density of image information displayed (recorded) can be reproduced in a state close to the intention of the transmitting party.

What is claimed is:

1. An image processing apparatus comprising:

image information input means for inputting image information;

density adjustment means for adjusting a density of the image information input through said image information input means at several levels;

false halftone process means for performing false halftone processing for the image information input through said image information input means;

density conversion characteristic storage means for storing a plurality of density conversion characteristics required when the false halftone processing is performed, for each type of a plurality of display destinations and for each of the levels of said density adjustment means;

density conversion characteristic selection means for selecting one among the plurality of density conversion characteristics stored in said density conversion characteristic storage means in response to the type of said display destinations for the image information and the adjustment level at which said density adjustment means has adjusted the density of the image information; and image data sending means for sending image data, for which the false halftone processing has been performed according to the density conversion characteristic selected by said density conversion characteristic selection means, to said display destinations in which the image data is to be displayed.

2. The image processing apparatus as claimed in claim 1, wherein said display destinations is record means of an apparatus to which the image data is to be transmitted.

3. The image processing apparatus as claimed in claim 1, wherein the false halftone processing is halftone processing by error diffusion.

4. The image processing apparatus as claimed in claim 1, wherein the false halftone processing is halftone processing with a dither matrix.

5. The image processing apparatus as claimed in claim 1, wherein at least one of said display destinations is record means of said image processing apparatus.

6. The image processing apparatus as claimed in claim 1, wherein said density conversion characteristic storage means stores at least two density conversion characteristics, one being a density conversion characteristic for reproducing the image information in said image processing apparatus and the other being a density conversion characteristic for reproducing the image information in a standard apparatus.

7. The image processing apparatus as claimed in claim 1, wherein said image information input means is means for reading the image information of an original document.

8. An image processing apparatus comprising:

image information input means for inputting image information;

density adjustment means for adjusting a density of the image information input through said image information input means at several levels;

false halftone process means for performing false halftone processing for the image information input through said image information input means;

density conversion characteristic storage means for storing a plurality of density conversion characteristics required when the false halftone processing is performed, for each type of a plurality of display destinations and for each of the levels of said density adjustment means;

display characteristic determination means for determining display characteristics of said display destinations for the image information;

density conversion characteristic selection means for selecting one among the plurality of density conversion characteristics stored in said density conversion characteristic storage means in response to a result of determination by said display characteristic determination means; and image data sending means for sending image data, for which the false halftone processing has been performed according to the density conversion characteristic selected by said density conversion characteristic selection means, to said display destinations in which the image data is to be displayed.

9. The image processing apparatus as claimed in claim 8, wherein said display destinations is record means of an apparatus to which the image data is to be transmitted.

10. The image processing apparatus as claimed in claim 8, wherein when said image data sending means sends the image data to display destinations not having the same display characteristic as said image processing apparatus, said density conversion characteristic selection means selects a density conversion characteristic for performing false halftone processing of a standard display characteristic.

11. The image processing apparatus as claimed in claim 8, wherein said density conversion characteristic selection means selects a density conversion characteristic for performing false halftone processing of a standard display characteristic for said display destinations whose display characteristic cannot be determined by said display characteristic determination means.

12. The image processing apparatus as claimed in claim 8, wherein said display characteristic determination means comprises means for determining a model of an apparatus with which said image processing apparatus is to communicate, a table for listing correspondence between models and their record characteristics, and record characteristic sense means for looking up in said table and sensing a record characteristic from the model determined by said model determination means.

13. The image processing apparatus as claimed in claim 8, wherein the false halftone processing is halftone processing by error diffusion.

14. The image processing apparatus as claimed in claim 8, wherein the false halftone processing is halftone processing with a dither matrix.

15. The image processing apparatus as claimed in claim 8, wherein at least one of said display destinations is record means of said image processing apparatus.

16. The image processing apparatus as claimed in claim 8, wherein said image information input means is means for reading the image information of an original document.

* * * * *